United States Patent [19]

Kammler et al.

[11] Patent Number: 6,144,889
[45] Date of Patent: Nov. 7, 2000

[54] METHOD OF GENERATING AND STORING AND OPERATING AN USER PROGRAM CONSISTING OF INSTRUCTIONS FOR A STORED-PROGRAM CONTROL UNIT

[75] Inventors: Heiko Kammler, Poppenricht; Michael Schiessl, München, both of Germany

[73] Assignee: Siemens AG, Munich, Germany

[21] Appl. No.: 09/029,330

[22] PCT Filed: Aug. 23, 1996

[86] PCT No.: PCT/EP96/03744

§ 371 Date: May 18, 1998

§ 102(e) Date: May 18, 1998

[87] PCT Pub. No.: WO97/09661

PCT Pub. Date: Mar. 13, 1997

[30] Foreign Application Priority Data

Sep. 5, 1995 [EP] European Pat. Off. .............. 95113939

[51] Int. Cl.[7] .................................................. G05B 19/42
[52] U.S. Cl. .................................. 700/86; 700/17; 700/87
[58] Field of Search .............................. 700/12, 17, 83, 700/87, 86, 89

[56] References Cited

U.S. PATENT DOCUMENTS

| 4,315,315 | 2/1982 | Kossiakoff | 395/701 |
|---|---|---|---|
| 4,710,863 | 12/1987 | Kaufmann et al. | 364/146 |
| 4,736,320 | 4/1988 | Bristol | 395/703 |
| 5,034,899 | 7/1991 | Schult | 395/141 |
| 5,126,956 | 6/1992 | Komiya et al. | 364/474.22 |
| 5,375,125 | 12/1994 | Oshima et al. | 714/38 |
| 5,377,315 | 12/1994 | Leggett | 395/140 |
| 5,508,909 | 4/1996 | Maxwell et al. | 364/147 |
| 5,696,971 | 12/1997 | Masih | 395/702 |
| 6,026,336 | 2/2000 | Sakurai et al. | 700/86 |

FOREIGN PATENT DOCUMENTS

| 0 089 194 | 9/1983 | European Pat. Off. . |
| 0 200 974 | 11/1986 | European Pat. Off. . |

OTHER PUBLICATIONS

Chung et al. "Recursive Computation of Limited Lookahead Supervisory Controls for Discrete Event Systems", pp. 3764–3769, IEEE 1992.

Florin et al. "Recursive Distributed Programming Schemes", pp. 122–128, IEEE 1993.

Primary Examiner—Thomas C. Lee
Assistant Examiner—Chun Cao
Attorney, Agent, or Firm—Kenyon & Kenyon

[57] ABSTRACT

During the program execution of a user program, the function code assigned to an output signal and the function parameters assigned to this function code are read first. For each function parameter, depending on whether this refers to an input signal or to another instruction, either the input signal is stored temporarily or a branch is made to the other instruction and its function code and function parameters are executed. The generation of the user program is carried out in a similar way. In addition, however, the storage or the as-valid identification of the user program is prevented if the function parameters of all the instructions of at least one output signal have not all been input.

8 Claims, 3 Drawing Sheets

METHOD OF GENERATING AND STORING AND OPERATING AN USER PROGRAM CONSISTING OF INSTRUCTIONS FOR A STORED-PROGRAM CONTROL UNIT

FIELD OF THE INVENTION

The present invention relates to a method for the generation and storage of a user program for a programmable controller.

SUMMARY OF INVENTION

An object of the present invention is to provide new methods for the generation and storage of a user program for a programmable controller and the apparatus of the programmable controller. When executing the user program, the programmable controller determines output signals for an industrial process from input signals from the individual process.

The object is achieved for the generation method and storage method in that the instructions of the user program consist in each case of a function code and function parameters assigned to the function code, in that the function parameters refer either to an input signal or to another instruction and in that the method has the following steps:

a) during the generation of the user program, for each output signal, beginning with the instruction to be assigned to the respective output signal, the instructions to be executed are called up, the following procedure being executed:

b) the function code to be executed is called up and stored temporarily;

c) the number of function parameters is established;

d) the function parameters are called up one after the other;

e) if the function parameter is an input signal, a reference to the input signal is stored temporarily;

f) if the function parameter is a new function code, a reference to a new instruction is stored temporarily, a branch is made to this new instruction and the other function code is stored temporarily and the steps c) to f) are repeated for the new instruction;

g) the temporarily stored function codes and the temporarily stored function parameters are stored in a non-volatile memory and, respectively, identified as valid, only after all the instructions of at least the respective output signal have been called up completely.

In addition, according to the operating method, the instructions of the user program in each case consist of a function code and function parameters assigned to the function code, the function parameters referring either to an input signal or to another instruction. The steps according to the present invention are as follows:

a) during the cyclic execution, for each instruction, beginning with the instructions assigned to the output signals, the following procedure is executed:

b) the function code assigned to the instruction and the function parameters assigned to this instruction are read;

c) for each function parameter a check is made as to whether this refers to another instruction;

d) if the function parameter refers to an input signal, the input signal is stored temporarily;

e) if the function parameter refers to another instruction, a branch is made to this other instruction and the steps b) to e) are repeated with the other instruction;

f) when all the function parameters have been exhausted, the output signal assigned to the instruction is determined.

DETAILED DESCRIPTION OF THE INVENTION

Figure 1:
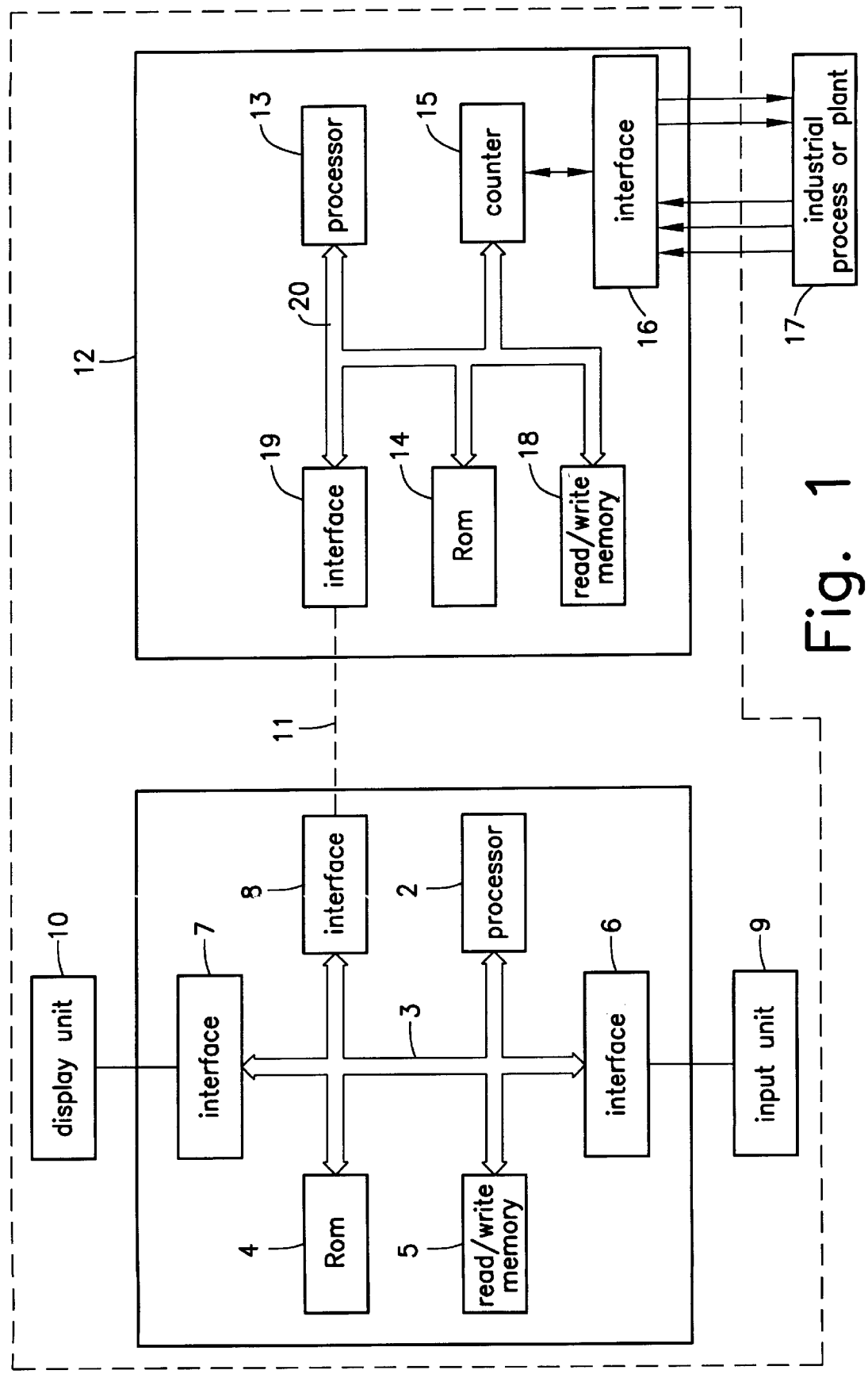
FIG. 1 shows a structure of a programming device and a programmable controller.

Referring first to FIG. 1, the programming device 1 includes a processor 2 which is connected via the bus system 3 to the read-only memory 4 and the read-write memory 5 and to the interfaces 6, 7 and 8. The operating system of the processor 2 is stored in the read-only memory 4, the read-write memory 5 serving as working memory for the programming device 1. Data can be entered into the programming device 1 via the interface 6 using the input unit 9, for example a keyboard. Data can likewise be displayed on the display unit 10 using the interface 7. Using the communications interface 8, the programming device is able to communicate with a programmable controller 12 via the communications connection 11 which is drawn with dashed lines.

The programmable controller 12 includes processer 13, which executes a user program. The user program consists of a multiplicity of instructions to be executed and is stored in the electrically eraseable and writeable read-only memory 14. In accordance with the user program to be executed, the processor 13 accesses via the controller 15 and the process interface 16; to an industrial process or to an industrial plant 17, which is not shown in more detail. From there, it reads in input signals, stores them in the read-write memory 18 and then determines output signals by reference to the user program. The output signals are likewise stored in the read-write memory 18 and then output via the controller 15 and the process interface 16 to the industrial process 17. In addition, the programmable controller 12 has an interface 19 to the programming device. The processor 13, the memories 14, 18, the controller 15 and the communications interface 19 are likewise connected to one another via a bus 20.

Programming device 1 and programmable controller 12 can be devices which are separate from each other. However, as is shown in FIG. 1 by the dashed line and also shown in FIG. 2, the programming device 1 is preferably integrated into the programmable controller 12. However, it is possible in both cases for the programming device 1 to access the read-only memory 14 via the interfaces 8 and 19 and via the communications connection 11. In this arrangement it is possible for a new user program to be written into the read-only memory 14 and for an existing user program to be read, erased or changed.

Figure 2:
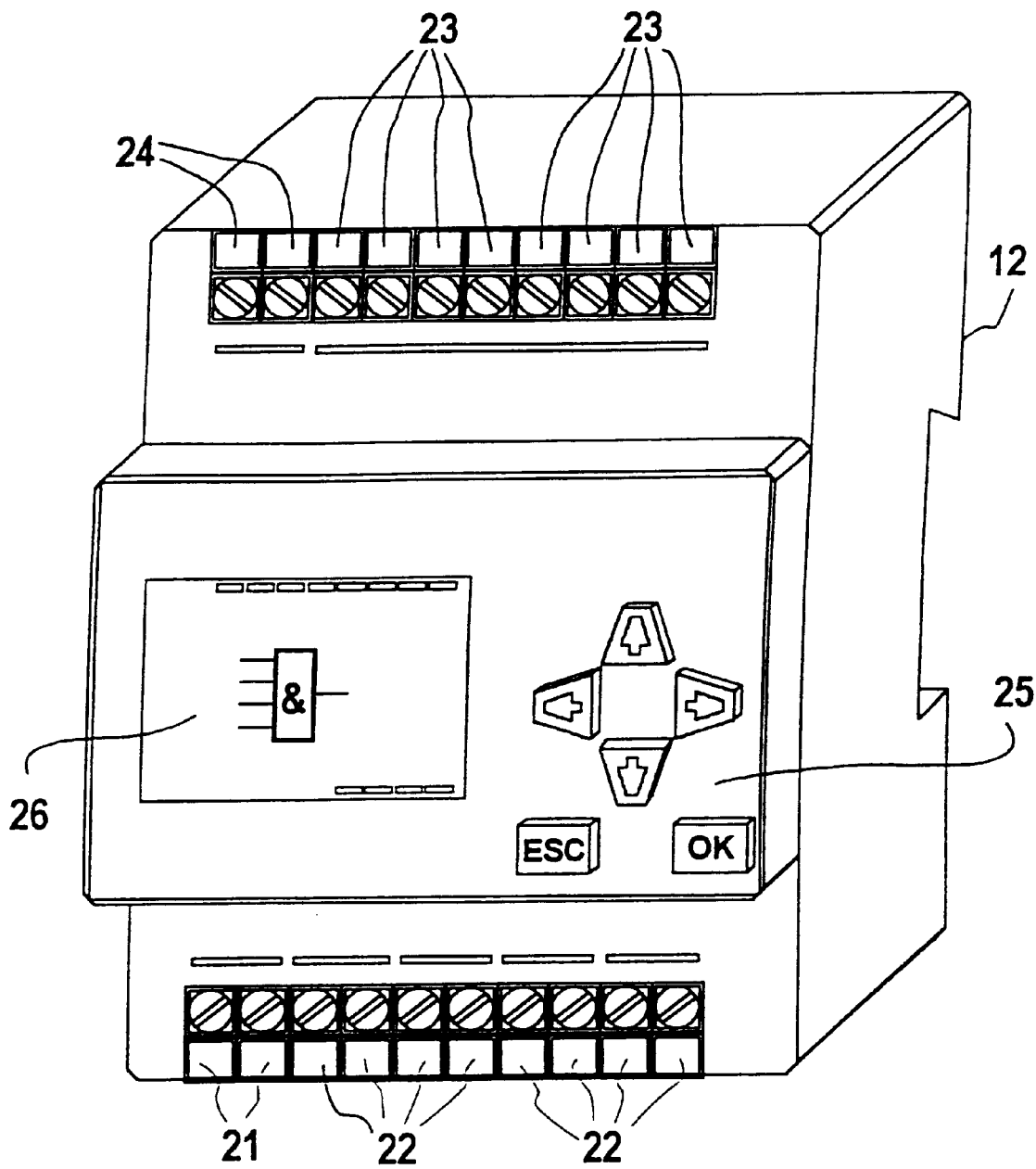
FIG. 2 shows an user interface of the programming device.

Referring now to FIG. 2, the programmable controller 12 has screw connections 21 to 24, a keyboard panel 25 and an LCD display 26. The programmable controller 12 can be connected to a 24 volt power supply via the screw connections 21. Via two screw connections 22 in each case, it is possible to output a digital output signal to the industrial process 17. One input signal from the industrial process 17 can be read in via each of the screw terminals 23. The actuators and sensors, which are connected to the screw terminals 22 and 23, can be supplied with power via the screw terminals 24. The screw terminals 22 to 24 are also an integral part of the process interface 16.

The LCD display 26 corresponds to the display unit 10 of the programming device 1. In addition, messages from the programmable controller 12 can be displayed via the display 26 during operation. The display 26 therefore also serves as an observation unit. The keyboard panel 25 allows instructions to be entered directly into the programming device 1 and into the programmable controller 12.

Generally, the user program consists of individual instructions, each instruction respectively consisting of a function code and function parameters assigned to the function code. In operation, the programmable controller executes the following sequence of instructions cyclically:

It reads in input signals from the industrial process 17.

It determines output signals for the industrial process by reference to the user program.

It outputs the output signals to the industrial process 17.

This procedure is generally known.

During the generation of the user program, the instructions to be executed are called up one after another by the programming unit 1 from the input unit 9. For this purpose, beginning with the instruction to be assigned to the first output signal, a query is raised as to which function is intended to be executed. A corresponding query is therefore output on the display unit 10 and the system waits until the user has input the function code via the input unit 9.

When the function code has been input, it is stored temporarily by the programming unit 1 in the read-write memory 5. The programming unit then establishes how many function parameters are assigned to this instruction. Here, a differentiation is to be made between the internal assignment within the programming device 1 and the number of function parameters which are visible to the user. Internally, the number of function parameters is the same for all function codes, equal to four in the predetermined example. Externally, however, it is always only the number of necessary function parameters which is called up. The following example is intended to explain this in more detail:

If the code for the OR operation is entered as the function code, four parameters are actually called up. These four parameters are then also taken into account later during the execution of the program. However, if, for example, the logic negation is selected as the function code, only one parameter, namely the input signal to be negated, is called up from the user. The other three parameters are filled in automatically by the programming device 1 and not taken into account during the execution of the program.

Following the calling-up and temporary storage of the function code in the read-write memory 5, the function parameters are also called up and temporarily stored one after another using the programming unit 1 together with the input unit 9 and the display unit 10. Either an input signal or another function code can be input as the function parameter. Here, when each function parameter is input, it is immediately checked as to whether this is a function code.

If the function parameter is not a function code but is instead an input signal, it is stored temporarily and the process is continued with the next function parameter. Input signals are in this case to be understood not only as input signals from the industrial process 17 but also signals whose value is known in advance. Examples of such signals are the constant one signal or the constant zero signal, as well as a clock signal.

If, on the other hand, a new function code is input as the function parameter, the function code is not stored temporarily as the function parameter but the address of a new instruction is instead stored. Immediately thereafter, a branch is made to this new instruction and there the directly previously input function code is stored temporarily. The number of function parameters is then reestablished and the function parameters are called up and stored temporarily.

Additionally, in the case of these function parameters, a check is again made immediately as to whether they are input signals or function codes. If they are new function codes, once more the address of this new instruction is stored immediately as the function parameter and a branch is made to this new instruction. Here, too, the function code which has just been input is stored. It is then established how many function parameters are needed and the function parameters are called up and stored temporarily.

This nested calling up of function codes and function parameters is continued until all of the function parameters of the function code last called up and temporarily stored refer to input signals. When all the function parameters refer to input signals, the respective instruction has been completely input. A return is then made to the preceding instruction and in the case of the latter, if appropriate, the next function parameter is called up and temporarily stored, a branch also being made here, if necessary, to further instructions.

The procedure mentioned above is continued until all the functions necessary to determine an output signal have been nested inside one another, i.e., all the function parameters of each instruction have been input. Only when this has been carried out is the instruction assigned to the next output signal called up and the procedure repeated, to the extent necessary. In this way, all the output signals are programmed one after another.

Of course, the input of the user program can be aborted at any time by the user. In this case, however, no storage of the part-program which has been input and temporarily stored is carried out. When the programming device 1 is switched off, the data which have been input are lost. Storage in the nonvolatile memory 14 of the user program which has been called up and temporarily stored in the read-write memory 5 is only made possible when the programming process has been fully completed. The programming process or the generation of the user program counts as fully completed when an instruction has been input for each output signal, and when each function parameter of each function code which has been programmed is occupied.

Figure 3:
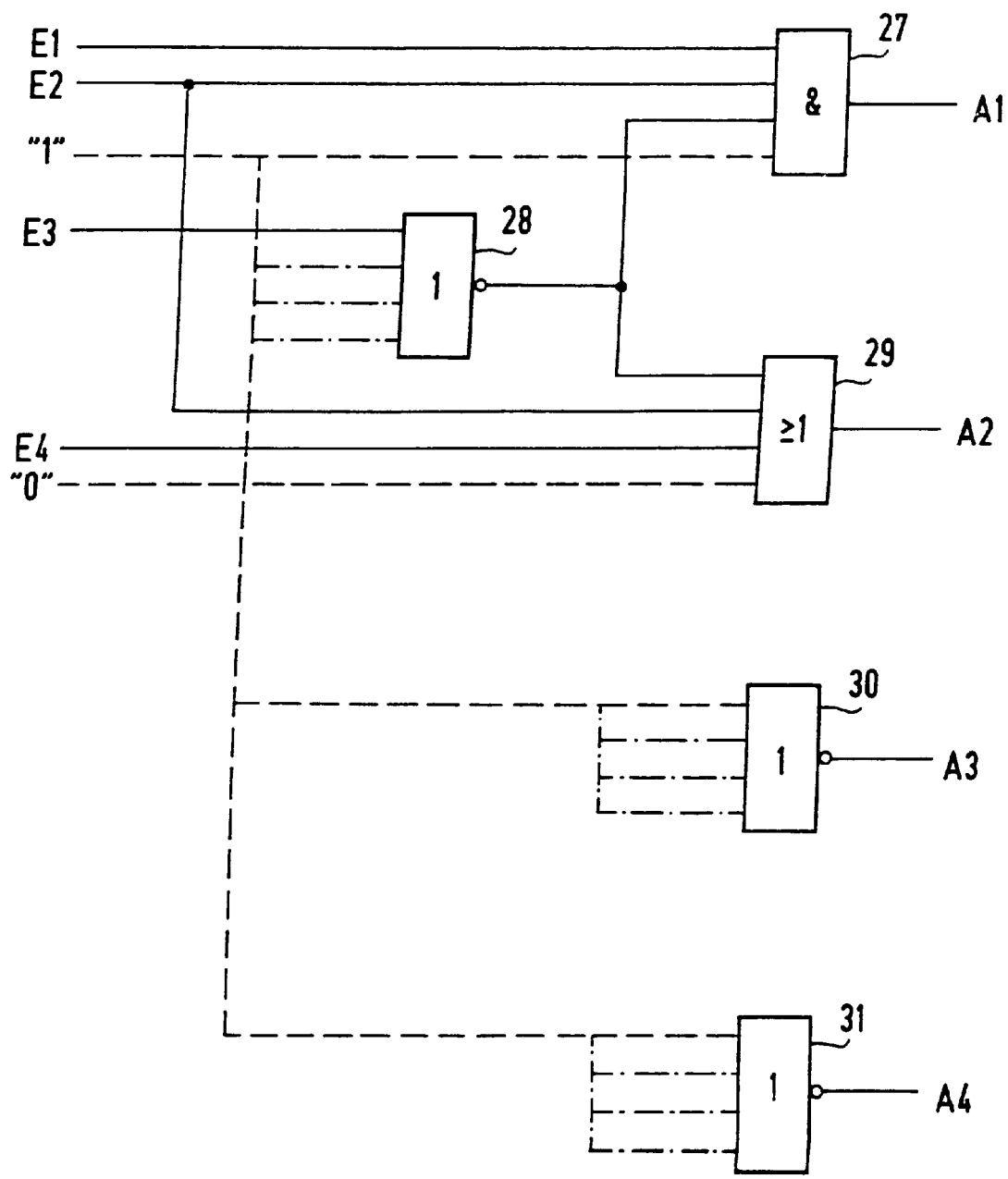
FIG. 3 shows a programming example.

FIG. 3 shows an example of a simple user program. Here, the continuous lines signify the connections necessary as a function of the desired linkages. The dashed lines show the additional connections required as a function of the programming scheme, and the chain-dotted lines show the connections automatically added by the programming device 1. The input of the example program according to FIG. 3 takes place as follows:

First, the programming device asks, via display unit 10 and input unit 9, which function code is needed for the determination of the output signal of the first output A1. The user then inputs, via the input unit, the fact that an AND operation 27 is to be carried out. The corresponding function code is stored temporarily in the read-write memory 5 of the programming device 1. Then, one after another, the first, the second and the third function parameters, i.e., three of the four input signals of the AND operation 27, are called up and stored temporarily.

The first and the second input parameters are the input signals E1 and E2. Therefore, during the input of these two function parameters, the system continues immediately with the next function parameter. When the third function parameter is called up, the user inputs the fact that he desires to undertake a NOT operation 28. As the third function parameter, therefore, the address of the instruction at which the NOT operation 28 will be handled, is temporarily stored.

A branch is then made by the programming device 1 to this instruction, and a query is raised as to which the (single) function parameter of the NOT operation 28 is intended to be. Here, the user inputs the input signal E3. The programming device 1 then stores this function parameter temporarily and supplements the instruction with three further function parameters, which in each case refer to the logic one. These three function parameters are also stored temporarily in the memory 5. This then completes the setting of the parameters for the NOT operation 28. A return is therefore made to the further setting of parameters for the AND operation 27, and the fourth function parameter is called up and temporarily stored. Since the AND operation 27 according to the example of FIG. 3 only has three true input parameters, the fourth input is connected to the logic one by means of a corresponding input by the user.

This completes the programming of the output A1, and the process continues with the programming of the output A2.

First, the query is raised and, following input by the user, the fact is temporarily stored that the function code for the generation of the output signal A2 is an OR operation 29. The four function parameters of the OR operation 29 are then called up one after another.

According to the programming example of FIG. 3, the already programmed NOT operation of the input E3 is input as the first function parameter. Since this operation has already been pre-programmed, no further input in relation to this function parameter is necessary and the process is continued with the second function parameter immediately after the temporary storage.

The second and the third function parameters are the (real) input signals E2 and E4, so that the process can continue immediately with the fourth function parameter.

According to the programming example of FIG. 3, the OR operation 29 also has only three input signals. The fourth function parameter therefore refers to the constant zero Since this also completes the programming of the output A2, the process continues with the output A3.

The outputs A3 and A4 are actually not needed in accordance with the given programming example. Therefore, the NOT operation 30 is selected for the output A3, which is linked to the logic one. As a result, the output A3 is connected to constant zero. The same takes place with the output A4, for which the NOT operation 31 is input. As an alternative, it is also possible to connect the outputs A3 and A4 directly to logic zero.

The program resulting therefrom is then stored in the memory 14. It is shown in the Table 1 below.

TABLE 1

| B1: | FC | (AND) |
|---|---|---|
|  | ADDR (E1) |  |
|  | ADDR (E2) |  |
|  | ADDR (B5) |  |
|  | ADDR ("1") |  |
| B2: | FC | (OR) |
|  | ADDR (B5) |  |
|  | ADDR (E2) |  |
|  | ADDR (E4) |  |
|  | ADDR ("0") |  |

TABLE 1-continued

| B3: | FC | (NOT) |
|---|---|---|
|  | ADDR ("1") |  |
|  | ADDR ("1") |  |
|  | ADDR ("1") |  |
|  | ADDR ("1") |  |
| B4: | FC | (NOT) |
|  | ADDR ("1") |  |
|  | ADDR ("1") |  |
|  | ADDR ("1") |  |
|  | ADDR ("1") |  |
| B5: | FC | (NOT) |
|  | ADDR (E3) |  |
|  | ADDR ("1") |  |
|  | ADDR ("1") |  |
|  | ADDR ("1") |  |

On the left in Table 1, in each case the beginning of the individual instructions is represented by B1 to B5. This information, however, serves only for explanation and is not an integral part of the stored program. In the actual program, FC stands for function code, ADDR for address.

The program as such consists of blocks of five bytes each. The first byte in each case represents the function code of the instruction, the other four bytes represent the four function parameters. The first four instructions B1 to B4 always define the instructions for the four output signals. Beginning at the fifth instruction B5, instructions are then stored to which access must be made indirectly during the calculation of the output signals.

The execution of the user program takes place as follows:

The instructions B1 to B4 are executed cyclically. During the execution of each of the instructions B1 to B4, the function code assigned to the instruction is read first. The function parameters assigned to this instruction are then read one after the other. During the reading of each function parameter, a check is immediately made as to whether this refers to another instruction. If the function parameter refers to an input signal, the latter is stored temporarily.

If, on the other hand, the function parameter refers to another instruction, a branch is made to this instruction immediately, i.e., before the reading of the other function parameters, and the function code assigned to this instruction and the function parameters assigned to this instruction are read. Here, too, if the function code points to a new instruction, this instruction is executed in turn, before the further function parameters are exhausted. When all the function parameters of an instruction have been exhausted, the output signal assigned to this instruction is determined, if appropriate a jump is made back to the calling instruction, and the determined output signal is used as a base for the further execution of the user program.

Here, too, it is intended to explain the principle in more detail with reference to the program according to the Table 1.

First, therefore, the function code of the instruction B1 is read. The function parameters are then read, which refer to the inputs E1 and E2. Upon reading the third function parameter, a branch is made to the instruction B5. Its function code and all four function parameters (since all refer to input signals) are read and the output signal assigned to the instruction B5 is determined. A return is then made to the instruction B1 with this output signal and the fourth function parameter is read. The output signal A1 is then determined and stored in the read-write memory 18.

Then, the function code of the instruction B2 is read and the first function parameter of the instruction B2. A branch is then made once more to the instruction B5, whose function code and whose four function parameters are read and the output signal of the instruction B5 is determined. A return is then made to the instruction B2 and the other three function parameters are read. The output signal of the instruction B2 is then determined.

Finally, the function code and the function parameters of the instruction B3 are also read and executed and the output signal A3 thus determined. The same takes place for the instruction B4 and the output signal A4 resulting therefrom.

Following the determination of the last output signal A4, the output signals A1 to A4 thus determined are output to the industrial process 17 and the input signals E1 to E4 are read in again. A new cycle in the determination of the output signals A1 to A4 is then begun.

As an alternative to the creation method described, it is also possible to store the instructions which belong to an output signal immediately in the nonvolatile memory 14, if the respective output signal has been completely programmed. Therefore, for example, the instructions B1 and B5 could be stored immediately, as soon as the output signal A1 has been completely programmed.

Likewise, it is also possible to store each input function code and each input function parameter immediately in the nonvolatile memory 14. Here, at the beginning of a program creation process, it would be necessary to store the fact that the programming of all the output signals A1 to A4 is invalid in an area of memory of the nonvolatile memory 14 specifically provided for this. For example, four 1-bit memory cells could be set to logic zero, in order to indicate that the four output signals A1 to A4 are not validly programmed. The four 1-bit memory cells could then be set to logic one when the output signals A1 to A4 have been validly programmed. The as-valid identification can in this case be carried out optionally following the creation of the entire user program or separately for each output signal A1 to A4 following the calling up of all the instructions of the respective output signal A1 to A4.

The instructions also do not have to be stored in the order according to the Table 1. It is, for example, possible to store all the instructions which are needed for the determination of the output signal A1 here the instructions B1 and B5, one after the another in the memory 14. The instructions B2 to B4 for determining the output signals A2 to A4 would then be stored after these instructions (here, B1 and B5). During the execution of the user program it is necessary in this case to track which is the highest address that is called up for determining the output signal A1. The instruction for determining the output signal A2 then begins at the next highest address. In a similar way, namely temporary storage of the highest address needed, it is then possible to determine at which location the instructions for determining the output signals A3 and A4 are arranged. However, it is entirely up to the person skilled in the art which procedure is given preference in the implementation of the present invention.

What is claimed is:

1. A method for the generation and storage of a user program for a programmable controller, the user program controlling the programmable controller to determine at least one output signal for an industrial process as a function of at least one input signal from the industrial process, the user program including a plurality of instructions, each at least one output signal associated with a respective one of the plurality of instructions, comprising the steps of:

for each at least one output signal, performing the steps of:

a) retrieving a first function code, the first function code having at least one respective function parameter, each at least one respective function parameter being associated with one of an input signal and a second function code, the first function code being associated with the respective one of the plurality of instructions associated with the output signal, b) temporarily storing the first function code, c) establishing a quantity of the at least one respective function parameter, and d) for each at least one respective function parameter, performing the steps of: i) if the respective function parameter is associated with the input signal, temporarily storing a reference to the input signal in association with the stored first function code, and ii) if the respective function parameter is associated with a second function code, and the second function code is a new function code, temporarily storing a reference to a new one of the plurality of instructions, temporarily storing the second function code in association with a new one of the plurality of instructions, the second function code having at least one respective function parameter, and repeating steps c)–d) for the second function code; and storing each temporarily stored first function code, each temporarily stored at least one respective function parameter, and each second function code in a nonvolatile memory only after all of the respective ones of the plurality of instructions associated with all of the at least one output signal are completely retrieved.

2. The method of claim 1, wherein one of the plurality of instructions is completely retrieved when each of the respective function parameters of a last processed function code are associated with an input signal.

3. The method of claim 2, wherein each of the temporarily storing steps includes the step of temporarily storing in volatile memory.

4. The method of claim 1, further comprising the step of identifying as valid all of the plurality of instructions when each temporarily stored first function code, each temporarily stored at least one respective function parameter, and each second function code are stored in nonvolatile memory.

5. A method for operating a programmable controller, the programmable controller cyclically executing a user program to determine at least one output signal for an industrial process as a function of at least one input signal for the industrial process, the user program including a plurality of instructions, a respective function code being assigned to each of the plurality of instructions, at least one respective function parameter assigned to the respective function code, each at least one function parameter referring to one of i) one of the at least one input signal, and ii) a different one of the plurality of instructions, comprising the steps of:

for each one of the plurality of instructions, performing the steps of:

a) reading the respective function code assigned to the one instruction, b) reading each of the at least one function parameters assigned to the respective function code, c) for each one of the at least one function parameters assigned to the respective function code, determining whether the one function parameter refers to the different one of the plurality of instructions, d) if the one function parameter refers to the one of the at least one input signal, temporarily storing the one of the at least one input signal, e) if the one function parameter refers to the different one of the plurality of instructions, branching to the different one of the plurality of instructions, and repeating steps a–e with respect to the different one of the plurality of instructions, and f) when all of the respective function parameters are exhausted, assigning one of the at least one output signals to the one instruction.

6. A programming unit for generating and storing of a user program for a programmable controller, the user program including a plurality of instructions, comprising:

a first arrangement retrieving and temporarily storing a respective function code assigned to each of a plurality of instructions to be executed, each respective function code associated with at least one respective function parameter;

a second arrangement determining a number of the at least one respective function parameter for each of the plurality of instructions to be executed;

a third arrangement retrieving and temporarily storing each of the at least one respective function parameters;

a fourth arrangement determining for each of the at least one respective function parameters if the respective function parameter is a new function code;

a fifth arrangement branching to a new instruction, for each of the at least one respective function parameters, if the respective function parameter is a new function code; and a sixth arrangement preventing at least one of i) the storing in nonvolatile memory of each respective temporarily stored function parameter, and ii) the identifying of the plurality of instructions as valid, if all of the at least one respective function parameters have not been temporarily stored.

7. A programmable controller, comprising:

means for reading each respective function code and each respective function parameter assigned to each of a plurality of instructions;

means for determining for each respective function parameter whether the respective function parameter refers to one of an input signal and a different instruction;

means for temporarily storing, for each respective function parameter, the input signal if the respective function parameter refers to an input signal;

means for branching to the different instruction, for each respective function parameter, if the respective function parameter refers to the different instruction;

means for returning to a calling instruction; and means for determining an output signal assigned to each of the plurality of instructions when all of the respective function parameters assigned to the instruction have been exhausted.

8. The programmable controller of claim 7, further comprising:

means for retrieving and temporarily the respective function code assigned to each of the plurality of instructions;

means for determining a number of the at least one respective function parameter for each of the plurality of instructions;

means for retrieving and temporarily storing each of the at least one respective function parameters;

means for determining for each of the at least one respective function parameters if the respective function parameter is a new function code;

means for preventing at least one of i) the storing in nonvolatile memory of each respective temporarily stored function parameter, and ii) the identifying of the plurality of instructions as valid, if all of the at least one respective function parameters have not been temporarily stored.

* * * * *